(12) United States Patent
Castro Borquez et al.

(10) Patent No.: US 11,231,739 B2
(45) Date of Patent: Jan. 25, 2022

(54) GYRAL-LINEAR ACTUATOR FOR ENCODER

(71) Applicant: Neural DSP Technologies Oy, Helsinki (FI)

(72) Inventors: Douglas Andres Castro Borquez, Helsinki (FI); Franco Azocar Dellepiane, Quilpué (CL)

(73) Assignee: NEURAL DSP TECHNOLOGIES OY, Helsinki (FI)

( * ) Notice: Subject to any disclaimer, the term of this patent is extended or adjusted under 35 U.S.C. 154(b) by 0 days.

(21) Appl. No.: 16/738,521

(22) Filed: Jan. 9, 2020

(65) Prior Publication Data

US 2021/0191449 A1 Jun. 24, 2021

Related U.S. Application Data

(60) Provisional application No. 62/952,552, filed on Dec. 23, 2019.

(51) Int. Cl.
*G05G 9/047* (2006.01)
*G06F 3/0338* (2013.01)
*G06F 3/0362* (2013.01)

(52) U.S. Cl.
CPC ....... *G05G 9/04792* (2013.01); *G06F 3/0338* (2013.01); *G06F 3/0362* (2013.01)

(58) Field of Classification Search
CPC .. G05G 9/04792; G06F 3/0338; G06F 3/0362
USPC ........................................................ 345/156
See application file for complete search history.

(56) References Cited

U.S. PATENT DOCUMENTS

| | | | | |
|---|---|---|---|---|
| 2,899,841 A | * | 8/1959 | Melloy | G05G 1/12 74/548 |
| 3,621,962 A | | 11/1971 | Aoki | |
| 4,771,141 A | * | 9/1988 | Flumignan | H01H 13/58 200/528 |
| 4,866,219 A | | 9/1989 | Riding et al. | |
| 5,180,050 A | | 1/1993 | Rada et al. | |
| 5,705,778 A | | 1/1998 | Matsui et al. | |

(Continued)

FOREIGN PATENT DOCUMENTS

| | | |
|---|---|---|
| EP | 1028446 B1 | 5/2008 |
| WO | 2008/014327 A1 | 1/2008 |

OTHER PUBLICATIONS

Extended European Search Report for European Patent Application No. 20151069.0; Munich, Germany; dated Jun. 18, 2020.

*Primary Examiner* — Albert K Wong
(74) *Attorney, Agent, or Firm* — Thomas E. Lees, LLC (57) ABSTRACT

A gyral-linear actuator for an encoder comprises an actuator housing having a first end, a second end opposite the first end, and a hollow. A control member extends from the first end of the actuator housing. A spring is positioned within the hollow of the actuator housing. Moreover, a coupler has an encoder connector and an extension that couples the control member to the encoder connector. Under this configuration, when the encoder connector is coupled to a rotary shaft of the encoder, rotation of the control member causes corresponding rotation of the encoder connector so as to turn the rotary shaft of the encoder, and depression of the control member causes corresponding depression of the rotary shaft of the encoder operating a switch function of the rotary encoder.

18 Claims, 8 Drawing Sheets

(56) References Cited

U.S. PATENT DOCUMENTS

| | | | |
|---|---|---|---|
| 5,847,335 A | 12/1998 | Sugahara et al. | |
| 5,894,118 A | 4/1999 | Nishimoto et al. | |
| 5,959,267 A | 9/1999 | Kawasaki et al. | |
| 6,194,673 B1 * | 2/2001 | Sato | H01H 19/005 200/11 R |
| 6,198,057 B1 * | 3/2001 | Sato | G06F 3/0312 200/19.18 |
| 6,420,667 B1 * | 7/2002 | Miwa | H01H 25/065 200/11 R |
| 8,130,214 B2 * | 3/2012 | Aimi | G06F 3/0383 345/184 |
| 10,504,672 B2 * | 12/2019 | Hu | H01H 19/14 |

\* cited by examiner

GYRAL-LINEAR ACTUATOR FOR ENCODER

CROSS REFERENCE TO RELATED APPLICATIONS

This application claims the benefit of U.S. Provisional Patent Application Ser. No. 62/952,552, filed Dec. 23, 2019, entitled GYRAL-LINEAR ACTUATOR FOR ENCODER, the disclosure of which is hereby incorporated by reference.

BACKGROUND

The present disclosure relates to actuators and in particular to actuators that are suitable for use with encoders.

Encoders are finding application in a variety of electronic devices, including processing devices typically used by musicians. In this regard, rotary encoders are particularly useful for digital processing devices including digital effect processors, modelers, and controllers, e.g., because the encoder is operated in a manner similar to a traditional potentiometer, which makes its use familiar to the typical musician.

BRIEF SUMMARY

According to aspects of the present disclosure, a gyral-linear actuator for an encoder comprises an actuator housing, a control member, a spring, a coupler, and an encoder connector. The actuator housing has a first end, a second end opposite the first end, and a hollow. The control member extends from the first end of the actuator housing, and the spring is positioned within the hollow of the actuator housing. The coupler has an encoder connector and an extension that couples the control member to the encoder connector. Under this configuration, the control member preferably provides a tactile interface that facilitates user interaction with the encoder. When the encoder connector is coupled to a rotary shaft of the encoder, rotation of the control member causes corresponding rotation of the encoder connector so as to turn the rotary shaft of the encoder. Likewise, depression of the control member causes corresponding depression of the rotary shaft of the encoder, thus operating a switch function of the rotary encoder.

According to a further aspect, the gyral-linear actuator's housing may further comprise a generally cylindrical body between the first end and the second end. Additionally, the body may comprise a male threaded portion on an outside periphery. Hence, the gyral-linear actuator may be coupled to a female threaded portion of a musical instrument easily.

According to a further aspect, the control member may comprise a neck axially received by the body of the actuator housing and a head positioned on a first end of the neck.

According to a further aspect, the control member may include an inside surface having a receiver that receives a distal end of the extension. Preferably, the receiver may comprise a socket. Further preferably, the socket may comprise a milled cross pattern.

According to a further aspect, the gyral-linear actuator may further comprise a cap that seats over the first spring, the cap having an aperture therethrough. Additionally, the encoder connector of the coupler may be positioned outside of the cap and the extension may pass through the aperture of the cap.

According to a further aspect, the actuator housing may further comprise a generally cylindrical body between the first end and the second end. The body may comprise a male threaded portion on an outside periphery and the cap may include a female threaded portion that threads onto the male threaded portion of the body of the actuator housing.

According to a further aspect, the extension of the coupler may comprise a primary shaft that connects to the control member. Additionally, the extension of the coupler may comprise a secondary shaft axially coupled to the primary shaft for relative axial movement therebetween. Preferably, the encoder connector is connected to the secondary shaft.

According to further aspects of the present disclosure, the primary shaft may have a hollow therein. The secondary shaft may be axially received in the hollow of the primary shaft. The primary shaft may have a male plug end that seats into a corresponding receptacle of the control member. Additionally, the primary shaft and the secondary shaft may have corresponding non-circular cross sections where the secondary shaft may be axially received in the hollow of the primary shaft. The encoder connector may be coupled to a rotary shaft of the encoder. Rotation of the control member may cause corresponding rotation of the encoder connector so as to turn the rotary shaft of the encoder. Additionally, depression of the control member may cause corresponding depression of the rotary shaft of the encoder operating a switch function of the rotary encoder.

According to a further aspect, the gyral-linear actuator may further comprise a secondary spring positioned in the hollow of the primary shaft adjacent to the secondary shaft.

According to a further aspect, the primary shaft may have a hollow therein. The primary shaft may have at least one key slot on an inside surface adjacent to the hollow. The secondary shaft may have at least one key that mates with a corresponding key slot of the primary shaft when the secondary shaft is axially received in the hollow of the primary shaft.

According to further aspects of the present disclosure, a gyral-linear actuator for an encoder comprises an actuator housing, a control member, a spring, a cap, and a coupler. The actuator housing has a first end, a second end opposite the first end, and a hollow. The control member extends from the first end of the actuator housing. Moreover, the spring is positioned within the hollow of the actuator housing, and the cap seats over the spring (e.g., the cap couples to the second end of the actuator housing). The coupler has an encoder connector and an extension. The encoder connector can be positioned "outside" the cap opposite the actuator housing. In this configuration, the extension couples between the control member and the encoder connector. For instance, the extension can pass through an aperture of the cap and extend into the hollow of the actuator housing, where the extension couples to the control member. In this regard, when the encoder connector is coupled to a rotary shaft of the encoder, rotation of the control member causes corresponding rotation of the encoder connector so as to turn the rotary shaft of the encoder. Moreover, depression of the control member causes corresponding depression of the rotary shaft of the encoder operating a switch function of the rotary encoder. In some embodiments, the control member is a button that is suitable for foot actuation of the switch function. Moreover, a user can grab and rotate the button, which correspondingly turns the rotary shaft of the encoder.

According to a further aspect of the present disclosure, the actuator housing may further comprise a generally cylindrical body between the first end and the second end. Additionally, the body may comprise a male threaded portion on an outside periphery.

According to a further aspect, the control member may comprise a neck axially received by the body of the actuator housing. Additionally, the control member may comprise a head positioned on a first end of the neck.

According to a further aspect, the control member may include an inside surface having a receiver that may receive a distal end of the extension. Additionally, the receiver may comprise a receptacle.

According to yet further aspects of the present disclosure, a gyral-linear actuator for an encoder comprises an actuator housing, a control member, a first spring, a primary shaft, a cap, and a shaft coupler. The actuator housing has a first end, a second end opposite the first end, a body between the first end and the second end, and a hollow that extends into the body from the second end thereof. The control member extends from the first end of the actuator housing. In this regard, the control member is rotatable within the actuator housing and is capable of axial movement within the body. The first spring is positioned within the hollow of the actuator housing, and the primary shaft is positioned within the first spring and within the hollow. Moreover, the primary shaft couples to the control member. The cap seats over the first spring. For instance, the cap can couple to the second end of the actuator housing, thus containing the first spring in the actuator housing between the control member and the cap. The shaft coupler has a secondary shaft that passes through an aperture of the cap and engages the primary shaft. The shaft coupler also includes an encoder connector at a distal end of the secondary shaft. When the gyral-linear actuator is connected to an encoder, the encoder connector couples to a rotary shaft of the encoder. Thus, in operation, rotation of the control member causes corresponding rotation of the primary shaft, which causes corresponding rotation of the secondary shaft, which causes corresponding rotation of the encoder connector so as to turn the rotary shaft of the encoder. Likewise, depression of the control member causes corresponding depression of the rotary shaft of the encoder via the primary shaft and the secondary shaft, thus operating a switch function of the rotary encoder. In some embodiments, a secondary spring is positioned in cooperation between the primary shaft and the secondary shaft.

According to further aspects, the body may comprise a male threaded portion on an outside periphery thereof. Further, the cap may comprise a cylindrical, knurled cap. Further, the aperture in the cap may be axially aligned with the body of the actuator housing.

DETAILED DESCRIPTION

A rotary encoder is a useful feature for electronic devices, including digital effect processors, modelers, and controllers. Such encoders provide even further usability and convenience when combined with a switch function. In this regard, a typical encoder includes an encoder shaft that can be rotated to generate encoder data. Moreover, the shaft can be pressed, e.g., in a direction orthogonal to a plane in which the encoder shaft is rotated, in order to operate a switch function. Unfortunately, encoders are currently provided as delicate electrical components that are not ruggedized. As such, a typical encoder is not suitable for harsh operating conditions such as using foot pressure to activate the switch of the encoder.

However, according to aspects of the present disclosure, a ruggedized actuator is provided as an encoder add-on, thus forming a ruggedized control. More particularly, the actuator herein extends the functionality of a typical rotary encoder, and in particular, a rotary encoder with a switch function, to a form that is usable in harsh environments that require ruggedized controls. A non-limiting example of a ruggedized application is to adapt an otherwise delicate encoder with a ruggedized actuator for use in a foot operable processing device. Such a device is used for instance, by musicians that require the ability to change settings of a processing device using foot switching while simultaneously playing an instrument, e.g., a keyboard, horn, percussion instrument, stringed musical instrument such as a guitar or bass, etc. A ruggedized actuator as described herein can also find application in industrial settings, e.g., on industrial controls, robots, industrial controllers, etc. Yet further, a ruggedized actuator as described herein can find application in industrial vehicles, consumer vehicles, various processing devices, etc., that require the use of an encoder.

Figure 1:
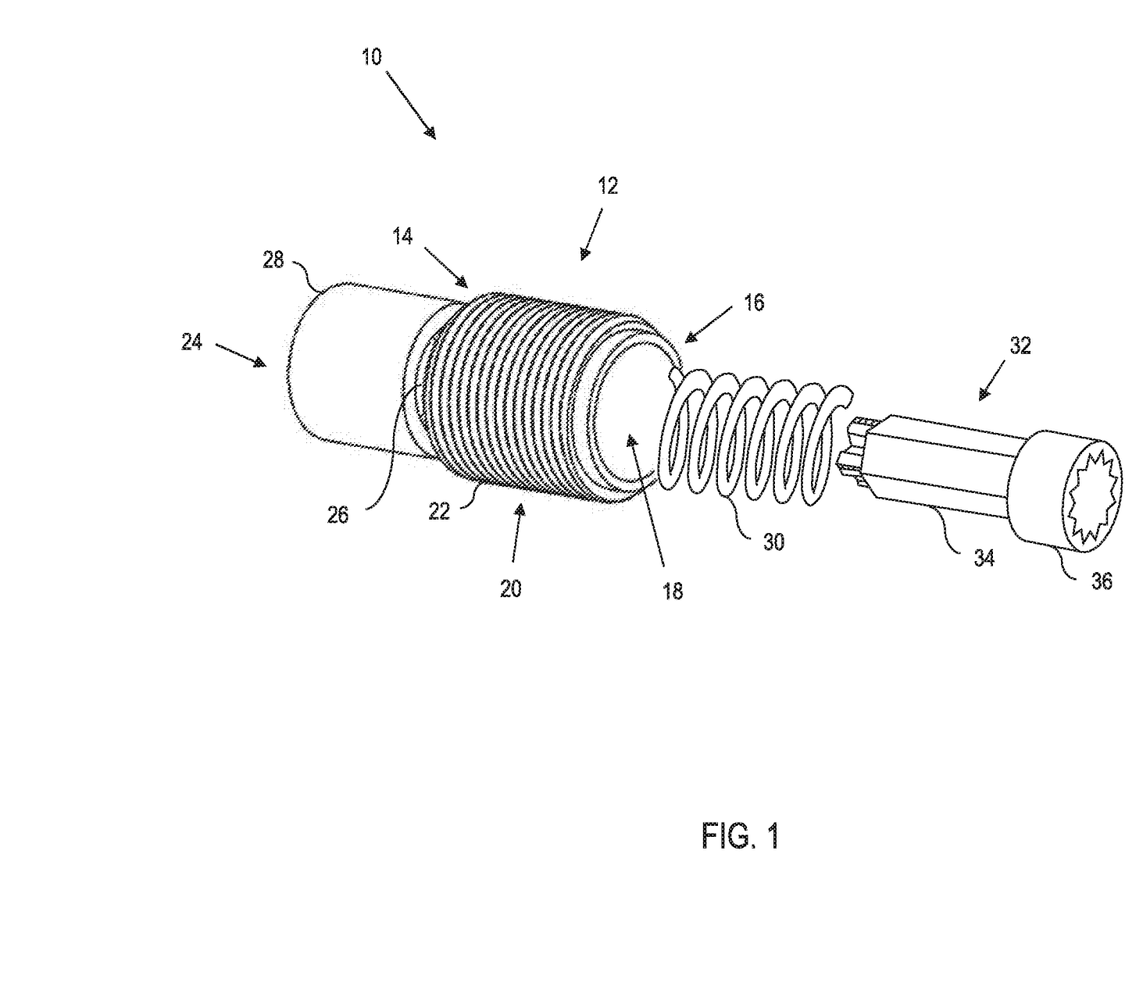
FIG. 1 is an example embodiment of a gyral-linear actuator according to aspects of the present disclosure.

Referring now to the drawings, and in particular to FIG. 1, an example embodiment of a gyral-linear actuator 10 is illustrated in an exploded view. The gyral-linear actuator 10 provides a ruggedized actuator that is suitable for attachment to an encoder, thus forming a ruggedized control. In this regard, the gyral-linear actuator 10 includes an actuator housing 12 having a first end 14, a second end 16 opposite the first end, and a hollow 18. As illustrated, the actuator housing 12 can further comprise a generally cylindrical body 20 between the first end 14 and the second end 16. The body 20 is illustrated as having a male threaded portion 22 on an outside periphery thereof. The male threaded portion 22 provides a convenient means to attach the gyral-linear actuator 10 to an equipment housing, e.g., using one or more nuts (not shown). Attachment of the actuator housing 12 rigidly and directly to an equipment housing provides a first force absorbing means that can transfer/distribute some force applied to the gyral-linear actuator 10 to the equipment housing thus isolating at least a portion of the applied force from a corresponding encoder.

In this regard, depending upon mounting requirements of the gyral-linear actuator 10, not all the body 20 need include a threaded portion 22. Moreover, in some embodiments, there may be no male threaded portion 22.

The gyral-linear actuator 10 also comprises a control member 24 extending from the first end 14 of the actuator housing 12. The control member 24 defines the portion of the gyral-linear actuator 10 for user interaction. For example, as will be described in greater detail herein. The control member 24 can be rotated relative to the body 20 (e.g., for rotational control of a corresponding encoder). The control member 24 may also be depressed relative to the body 20 (e.g., to control a switch function, where provided, on a corresponding encoder). As such, the control member 24 is also capable of axial movement relative to the body 20. As such, the control member 24 may be configured in a manner that facilitates rotation and/or axial movement relative to the actuator housing 12.

By way of example, the illustrated control member 24 includes a neck 26 axially received by the body 20 of the actuator housing 12. The control member 24 is also illustrated as having a head 28 positioned on a first (distal) end of the neck 26. In this regard, a user can actuate a switch by depressing the head 28 of the control member 24, which axially moves the neck 26 into the body 20. In some embodiments, the gyral-linear actuator 10 is ruggedized in a manner making the device suitable for operation by a foot of a user. In this example implementation, the head 28 is dimensioned so as to be comfortable to fit underneath a typical user's foot. The neck 26 provides a convenient way to position the head 28, and optionally control a throw (i.e., maximum length of axial travel) of the control member 24 relative to the actuator housing 12.

In some embodiments, the control member 24 can optionally include a shoulder, flange, washer, nut, or other suitable structure (not shown) that is positioned in the hollow 18 that forms an interference preventing the control member 24 from pushing through the first end 14 of the actuator housing 12. Alternatively, the actuator housing 12 can "neck in" or include other feature that prevents the control member 24 from pushing through the first end 14 of the actuator housing 12.

The gyral-linear actuator 10 also comprises a spring 30 within the hollow 18 of the actuator housing 12. The spring 30 is illustrated as a conventional coil spring. However, other spring configurations and materials can be used. For instance, the spring 30 can be a resilient material, etc. The spring 30 provides the primary resistance to depression of the head 28 of the control member 24, e.g., to activate a switch of a corresponding encoder. The spring 30 also provides a return force that biases the head 28 of the control member 24 away from the actuator housing 12 in a ready position to be actuated. For instance, an end of the spring 30 can engage the neck 26 (or other suitable abutment surface) of the control member 24 to bias the control member 24 relative to the actuator housing 12. Stepping on the head 28 or otherwise axially moving the head 28 towards the actuator housing 12 compresses the spring 30. When pressure is relieved from the head 28 of the control member 24, the biasing force of the spring 30 returns the control member 24 to a ready state where the head 28 is axially returned to a position distal from the actuator housing 12. In this regard, the specific parameters of the spring 30 are selected to account for a desired switch resistance, which is likely to be application dependent. In some embodiments, the spring 30 further ruggedizes the gyral-linear actuator 10 by setting a bias force to correspond to a force anticipated by foot pressure.

The gyral-linear actuator 10 still further includes a coupler 32. The coupler 32 includes an extension 34 and an encoder connector 36. The extension 34 is a generally elongate member that couples the control member 24 to the encoder connector 36. The encoder connector 36 provides a connection to a corresponding rotary encoder. As such, the shape and configuration of the encoder connector 36 can vary, e.g., depending upon the geometry of the shaft of a select encoder that the gyral-linear actuator 10 attaches. For instance, the encoder connector 36 illustrated in FIG. 1 includes a bell that forms a friction fit with an encoder shaft. In this regard, the encoder connector 36 can be integral with the extension 34, or the encoder connector 36 can be attached, connected, or otherwise fixed to the extension 34.

Figure 2:
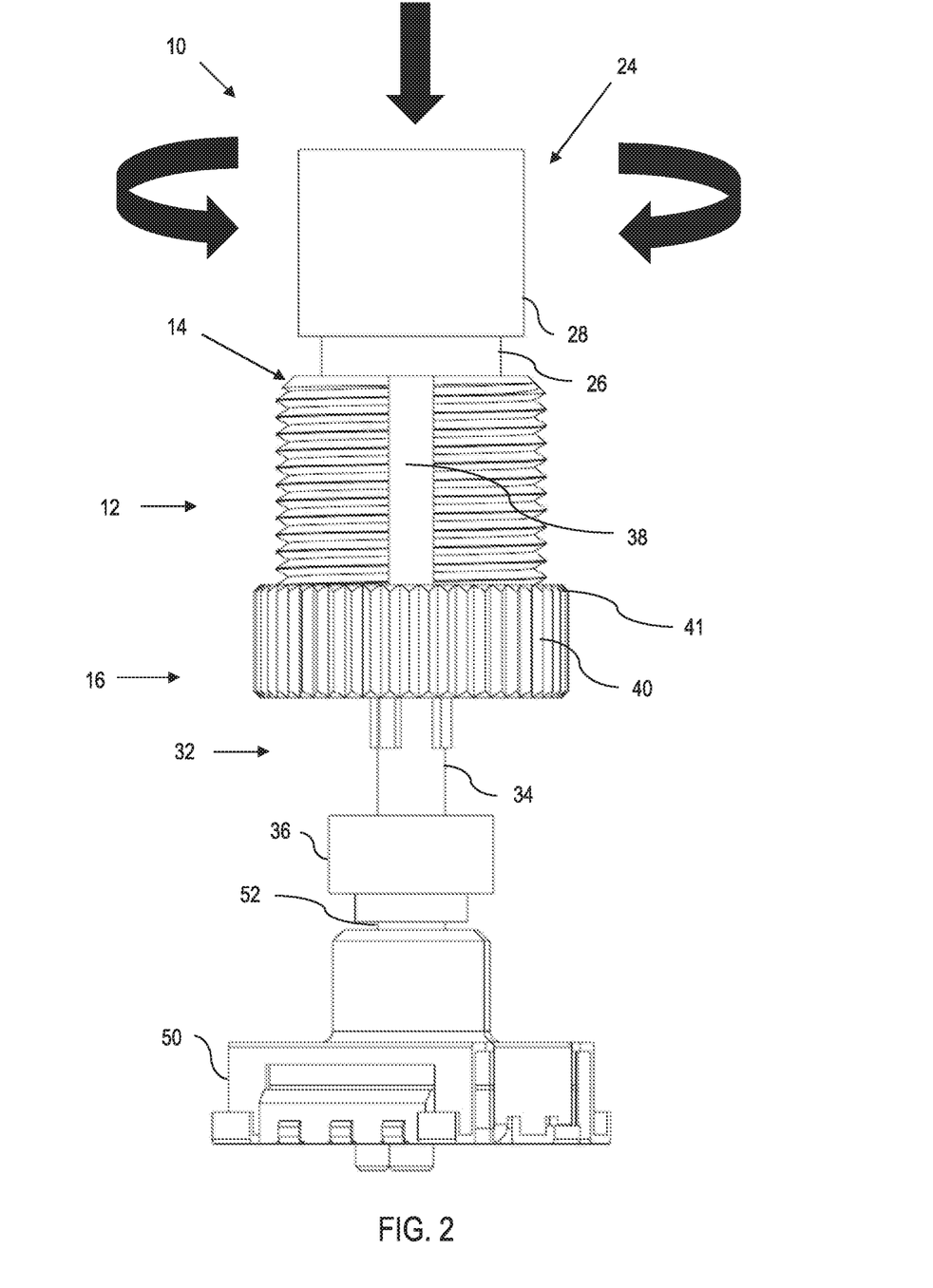
FIG. 2 is a side view of a gyral-linear actuator shown connected to an exemplary rotary encoder according to aspects of the present disclosure.
Figure 3:
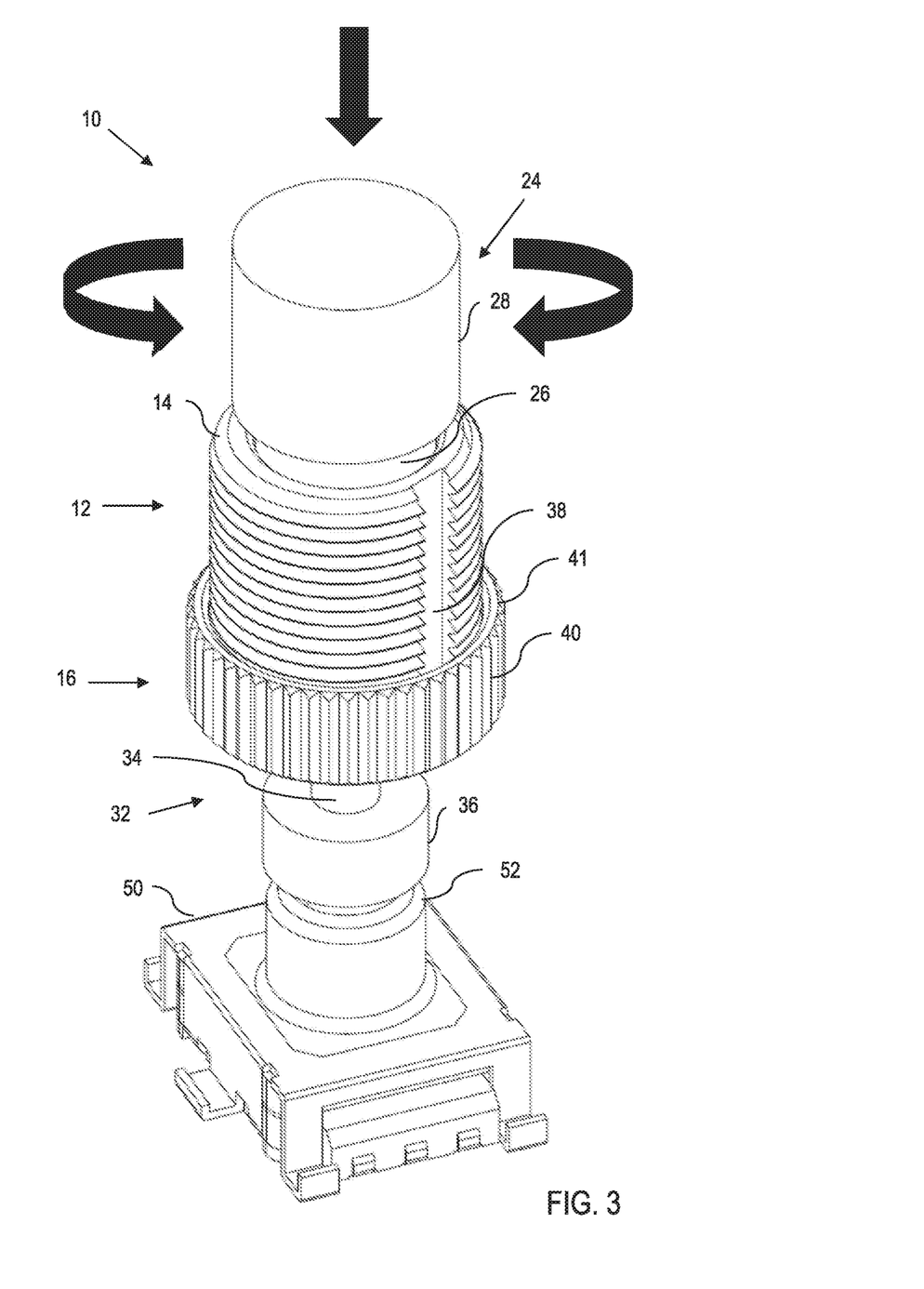
FIG. 3 is a perspective view of the gyral-linear actuator of FIG. 2.
Figure 4:
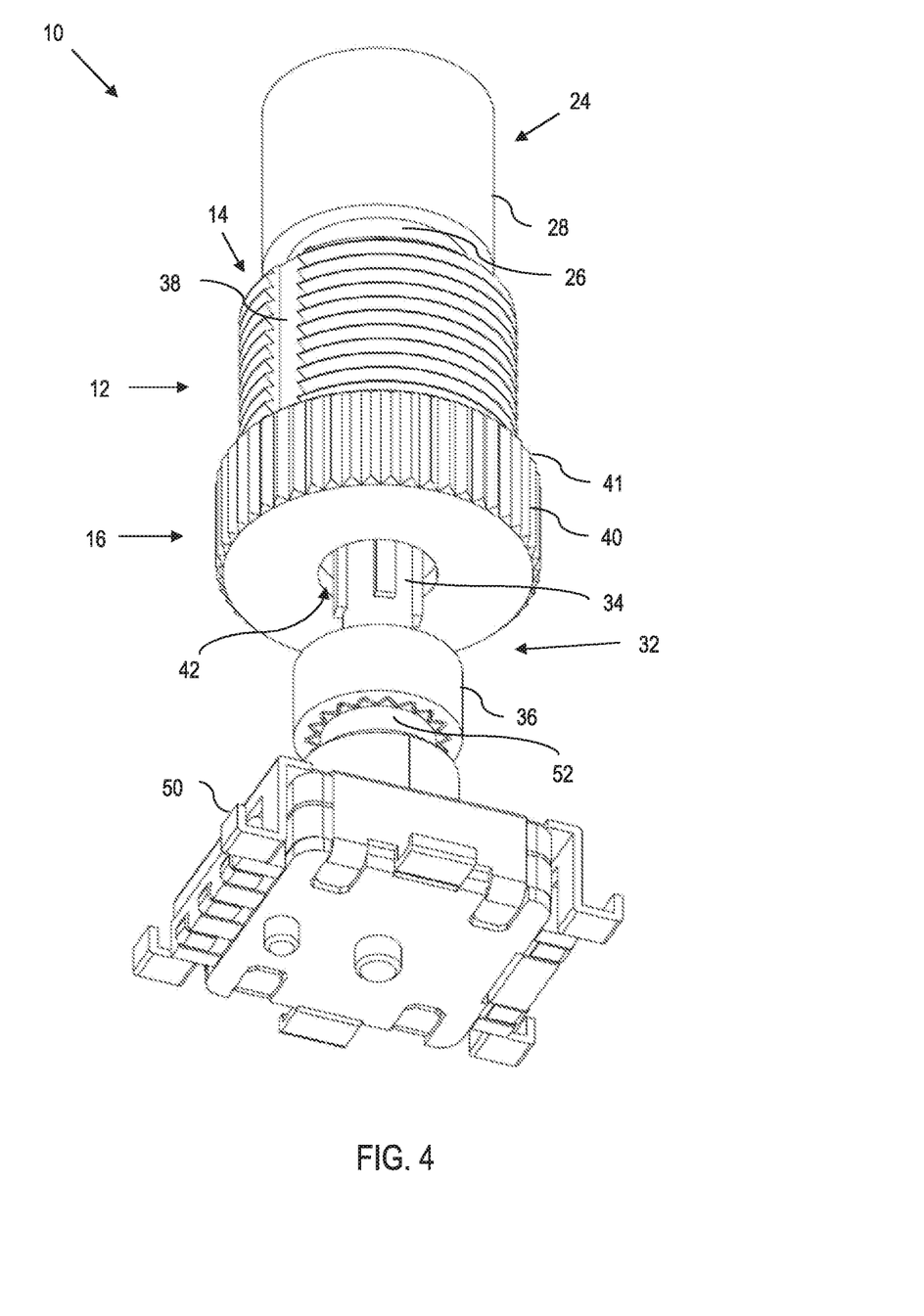
FIG. 4 is another perspective view of the gyral-linear actuator of FIG. 2.

Referring to FIG. 2, FIG. 3, and FIG. 4 generally, an example implementation of the gyral-linear actuator 10 is shown attached to an encoder to form a ruggedized control. Notably, the gyral-linear actuator 10 illustrated in FIG. 2-FIG. 4 is presented for illustrative purposes, and can include any combination of features and/or structures described in the various embodiments of gyral-linear actuators described herein. As such, like structure is illustrated with like reference numbers except as otherwise noted.

For sake of illustration of operation, FIG. 2-FIG. 4 collectively show a gyral-linear actuator 10 having an actuator housing 12. The actuator housing 12 can include features analogous to that described with regard to FIG. 1. Moreover, the actuator housing 12 in this illustrated embodiment includes a keyway 38 along an outside periphery thereof (e.g., in an axial direction). The keyway 38 is not required, but provides a convenient way to lock the gyral-linear actuator 10 to a corresponding enclosure (e.g., using a corresponding key) so that the actuator housing 12 does not rotate or twist relative to the enclosure.

Analogous to that shown in FIG. 1, extending axially from a first end 14 of the actuator housing 12 is a control member 24 having a neck 26 and head 28.

FIG. 2-FIG. 4 also show an embodiment where the gyral-linear actuator 10 includes a cap 40. The cap 40 is optional, e.g., the functionality of the cap 40 can be implemented in another means, such as the design of the actuator housing 12 itself. In general, the cap 40 threads onto the actuator housing 12 and provides an abutment surface for the spring (not shown—but analogous to the spring 30 of FIG. 1). For instance, where the actuator housing 12 includes a male threaded portion 22, the cap 40 can include a female threaded portion that threads onto the male threaded portion 22 of the body 20 of the actuator housing 12. The cap 40 can also be implemented as a cylindrical, knurled cap 40.

Thus, in an example embodiment, an inside surface of the cap 40 that covers over the second end 16 of the actuator housing 12 can be used to define an abutment surface so that the spring 30 (FIG. 1) is seated between the abutment surface of the cap 40 and the control member 24. The cap 40 can also provide an external shoulder 41 for mounting the gyral-linear actuator 10 to a corresponding enclosure (not shown), e.g., when used in combination with a nut (not shown) that threads onto the actuator housing 12.

Additionally, the cap 40 has an aperture 42 that extends therethrough. The aperture 42 is coaxially aligned with the coupler 32, and provides a means for the extension 34 to pass from within the actuator housing 12 (where the extension 34 couples to the control member 24), to a position outside the actuator housing 12 (where the extension 34 couples to the encoder connector 36).

FIG. 2-FIG. 4 further show the gyral-linear actuator 10 coupled to an encoder 50. When the encoder connector 36 of the gyral-linear actuator 10 is coupled to a rotary encoder shaft 52 of the encoder 50, rotation of the control member 24 causes corresponding rotation of the encoder connector 36 so as to turn the rotary encoder shaft 52 of the encoder 50. Likewise, depression of the control member 24 causes corresponding depression of the rotary encoder shaft 52 of the encoder 50 (e.g., via the coupler 32 including the extension 34 and the encoder connector 36), thus operating a switch function of the rotary encoder 50. Here, the "throw" of the switching function can be controlled in part, by the length of the neck 26 of the control member 24, as the head 28 causes interference with the actuator housing 12, thus limiting the axial travel of the control member. The spring 30 (FIG. 1) within the actuator housing 12 can also potentially limit the axial travel distance due to compression.

The spring 30 (not shown) provides a biasing force to default the control member 24 to an extended state distally displaced axially from the actuator housing 12, thus corresponding to a retracted position of the coupler 32. The spring 30 also sets the "stiffness" or resistance to the gyral-linear actuator 10. As the head 28 of the control member 24 is depressed (axially moved towards the actuator housing 12), the coupler 32 correspondingly moves axially downward. This axial movement operates the switch function of the encoder 50. In this embodiment, the coupler 32 is fixedly connected to the control member 24. As such, rotation of the head 28 and/or neck 26 cause corresponding rotation of the coupler 32. As the coupler 32 rotates responsive to rotation of the control member 24, the encoder connector 36 rotates the rotary encoder shaft 52, thus operating the encoder 50. Here, the encoder connector 36 may form a frictional connection to the rotary encoder shaft 52, e.g., making the connection temporary/non-permanent. Moreover, the frictional mating of the encoder connector 36 to the rotary encoder shaft 52 ensures reliable operation as a switch and rotational encoder.

Figure 5:
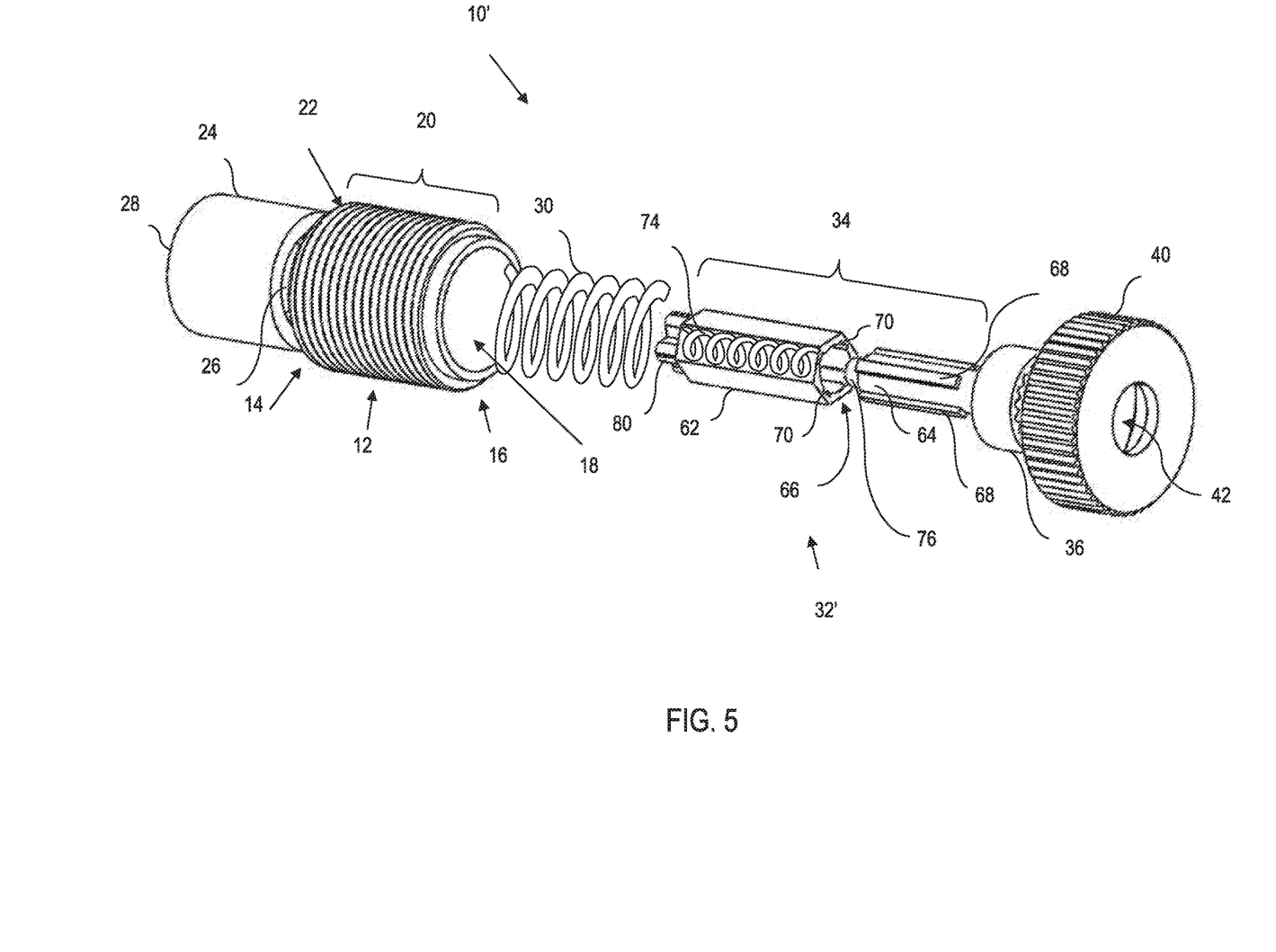
FIG. 5 is another example embodiment of a gyral-linear actuator according to aspects of the present disclosure.

Referring to FIG. 5, another embodiment of a gyral-linear actuator 10' is illustrated according to various aspects of the present disclosure. In this regard, the gyral linear actuator of FIG. 5 includes components analogous to the gyral-linear actuator 10 of FIG. 1-FIG. 4. As such, like structure is illustrated with like reference numbers, and operation is analogous unless otherwise discussed herein.

Analogous to that illustrated in FIG. 1, the gyral-linear actuator 10' includes an actuator housing 12 having a first end 14, a second end 16 opposite the first end, and a hollow 18. As illustrated, the actuator housing 12 further comprises a generally cylindrical body 20 between the first end 14 and the second end 16. Moreover, the body 20 is illustrated as having a male threaded portion 22 on an outside periphery thereof.

The gyral-linear actuator 10 also comprises a control member 24 extending from the first end 14 of the actuator housing 12. By way of example, the illustrated control member 24 includes a neck 26 axially received by the body 20 of the actuator housing 12, and a head 28 at the distal end of the neck 26. The control member 24 is configured for rotational movement relative to the actuator housing 12, and for axial movement within the hollow 18 of the actuator housing 12.

The gyral-linear actuator 10' also comprises a spring 30 within the hollow 18 of the actuator housing 12. An optional cap 40 can be used to contain the spring 30 within the hollow 18 of the actuator housing 12.

The above components of the gyral-linear actuator 10' are analogous to those like parts of FIG. 1, and will thus not be discussed further.

Different from the embodiment of FIG. 1, the gyral-linear actuator 10' includes a coupler 32'. The coupler 32' is analogous to the coupler 32 of FIG. 1, in that the coupler 32' includes an extension 34 and an encoder connector 36. However, as illustrated in the embodiment of FIG. 5, the extension 34 of the coupler 32' comprises a primary shaft 62 that connects to the control member 24. The extension 34 also comprises a secondary shaft 64 axially coupled to the primary shaft 62 for relative axial (but not rotational) movement therebetween. In this regard, the encoder connector 36 is connected to the secondary shaft 64. Here the encoder connector 36 can be integral with the secondary shaft 64, or the encoder connector 36 can connect as a separate component.

FIG. 5 is an exploded view for illustrative purposes. In this regard, the cap 40 is schematically shown to the right of the secondary shaft 64. In practice, the secondary shaft 64 may pass through the aperture 42 in the cap 40 such that a bell defining the encoder connector 36 is on one side of the cap 40 opposite the length of the secondary shaft 64 as described more fully herein.

In an example embodiment, the primary shaft 62 is a generally elongate shaft structure having a hollow 66 therein. The secondary shaft 64 is axially received in the hollow 66 of the primary shaft 62. However, the generally elongate shaft need not be cylindrical. For instance, the primary shaft 62 can have any desired geometric cross-section (e.g., square, rectangular, circular, hexagonal, etc.). Analogously, the secondary shaft 64 is also a generally elongate shaft structure. However, the generally elongate shaft need not be cylindrical. For instance, the secondary shaft 64 can have any desired geometric cross-section (e.g., square, rectangular, circular, hexagonal, etc.). Moreover, the primary shaft 62 and the secondary shaft 64 need not have the same shape. For instance, as shown in FIG. 5 (solely for illustrative, non-limiting purposes), the primary shaft 62 has a generally hexagonal cross-section, whereas the secondary shaft 64 has a generally "star pattern" cross-section due to the key arrangement.

As noted above, the primary shaft 62 axially moves relative to the secondary shaft 64. In this regard, certain embodiments can include a feature such as a key 68 (or set of keys 68) on the outside surface of the secondary shaft 64 that mate with corresponding key slot(s) 70 on an inside surface of the primary shaft 62 adjacent to the hollow 66 when the secondary shaft 64 is axially received in the hollow 66 of the primary shaft 62. This arrangement allows axial movement of the primary shaft 62 relative to the secondary shaft 64, while restricting rotational relative movement of the primary shaft 62 relative to the secondary shaft 64. Thus, in some embodiments, the secondary shaft 64 has at least one key 68, and correspondingly, the primary shaft 62 has at least one key slot. Each key of the secondary shaft 64 mates with a corresponding key slot of the primary shaft 62 when the secondary shaft 64 is axially received in the hollow 66 of the primary shaft 62.

Also, in some embodiments (not shown), the second shaft 64 may axially receive the primary shaft 62. Under such embodiments, a feature such as a key or set of keys can be provided on the outside surface of the primary shaft 62 that mate with corresponding key slots (not shown) on an inside surface of the second shaft 64, e.g., analogous to that described above.

Thus, in some embodiments, the primary shaft 62 and the secondary shaft 64 have corresponding non-circular cross sections where the secondary shaft 64 is axially received in the hollow 66 of the primary shaft 62. In other example implementations, the primary shaft 62 and/or the secondary shaft 64 can have a circular cross-section, e.g., so long as when the encoder connector is coupled to a rotary shaft of the encoder, rotation of the control member causes corresponding rotation of the encoder connector so as to turn the rotary shaft of the encoder, and depression of the control member causes corresponding depression of the rotary shaft of the encoder operating a switch function of the rotary encoder.

Moreover, in some embodiments, a secondary spring 74 is positioned between the primary shaft 62 and the secondary shaft 64. For instance, the secondary spring 74 can be placed in the hollow 66 of the primary shaft 62 adjacent to the secondary shaft 64 (e.g., adjacent to a first end thereof). In this regard, the secondary shaft 64 may include a feature 76 such as a tip, nub, dome, etc., that provides a seat that receives an end of the secondary spring 74. This configuration assists to prevent switch failure due to excess force, serving as a secondary dampener to the spring 30. Moreover, the secondary spring 74 extends the linear action (axial) range making the gyral-linear actuator 10 compatible with different encoders by allowing for compensation in the variability of switch travel distance. As such, the gyral-linear actuator 10' includes adjustable features (including features that auto-adjust) for different applications.

Also shown in FIG. 5 is an embodiment where the primary shaft 62 has a male plug end 80 that seats into a corresponding receptacle of the control member 24. The male plug end 80 can also be implemented on the embodiment of FIG. 1. Also, the plug/socket relationship can be reversed, where the control member 24 includes a male plug end that connects to a mating socket in the end of the coupler 32.

As an example of assembly, the control member 24 is installed in actuator housing 12. The control member 24 includes (e.g., via the neck 26 or some other suitable component), a feature that prevents the control member from pushing through the first end 14 of the actuator housing 12. The spring 30 is dropped into the hollow 18 of the actuator housing 12 through the second end 16. Then, the primary shaft 62 is dropped into the hollow 18 of the actuator housing 12 within the spring 30 such that the end 80 mates with a corresponding receptacle of the control member 24. The cap 40 is then screwed onto the threaded portion 22 of the body 20 (or is otherwise attached to the body 20) of the actuator housing 12 thus containing the spring 30 within the actuator housing 12.

The secondary spring 74 is dropped through the aperture 42 of the cap 40 and into the hollow 66 of the primary shaft 62. Then the secondary shaft 64 is passed through the aperture 42 of the cap 40 and is axially received into the hollow 66 of the primary shaft 62 seating the secondary spring 74. Here, the shaft portion of the secondary shaft 64 extends through the aperture 42 in the cap 40 and the "bell" of secondary shaft 64 defining the encoder connector 36 extends axially past the cap 40.

Figure 6:
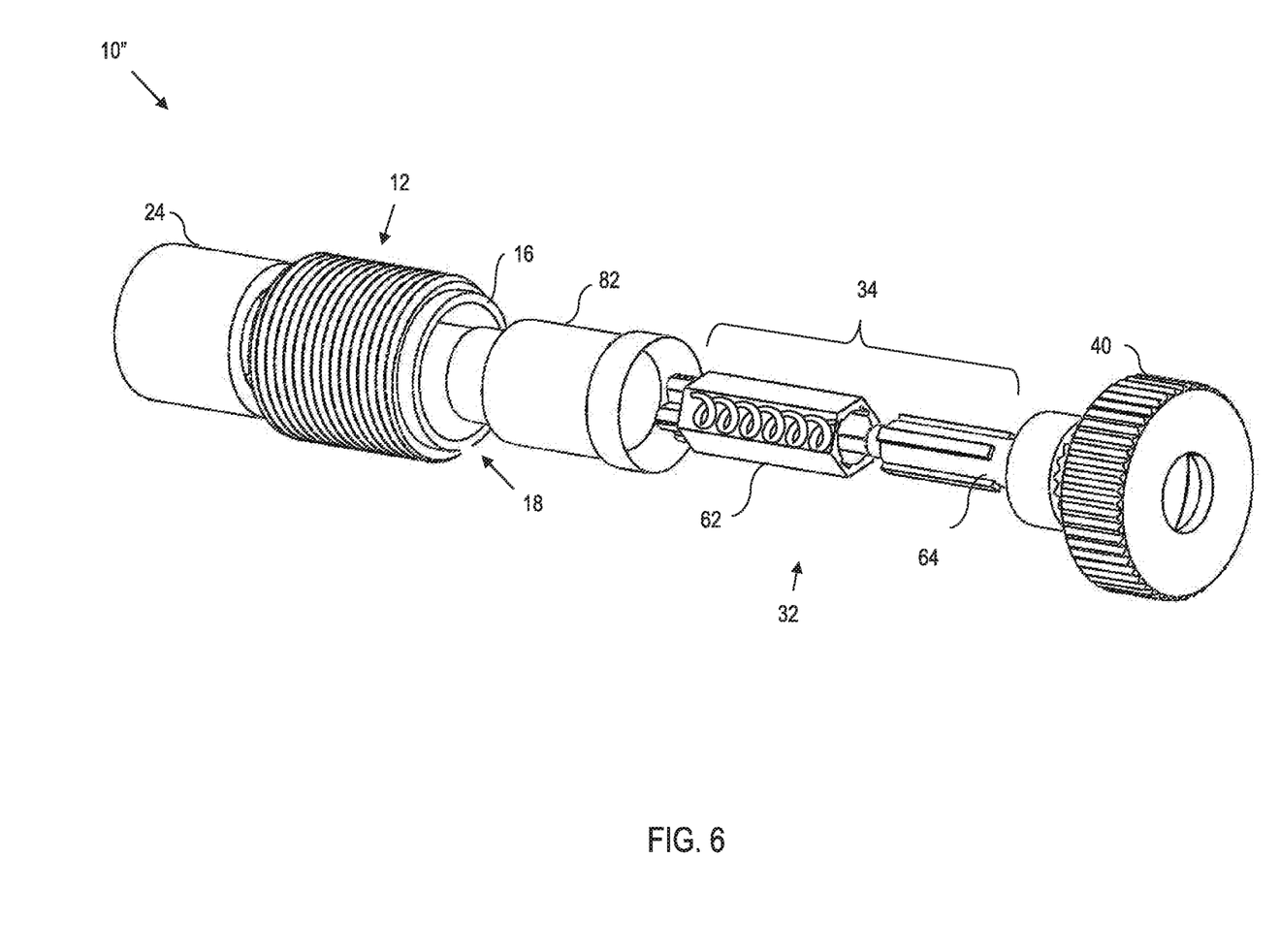
FIG. 6 is yet another example embodiment of a gyral-linear actuator according to aspects of the present disclosure.

Referring to FIG. 6, a gyral-linear actuator 10" is illustrated according to further embodiments of the present invention. In this regard, the gyral linear actuator 10" of FIG. 6 includes components analogous to the gyral-linear actuator 10' of FIG. 5. As such, like structure is illustrated with like reference numbers, and operation is analogous unless otherwise discussed herein.

Here, in order to seat the coupler 32 into the actuator housing 12, an insert 82 is installed into the hollow 18 at the second end 16 of the actuator housing 12. The insert 82 engages the control member 24 and provides a socket for receiving the plug end 80 of the extension 34 (e.g., primary shaft 62 as shown). Here, the spring 30 is removed for clarity of illustrating the insert 82. However, where desired, the spring 30 can be included.

Figure 7:
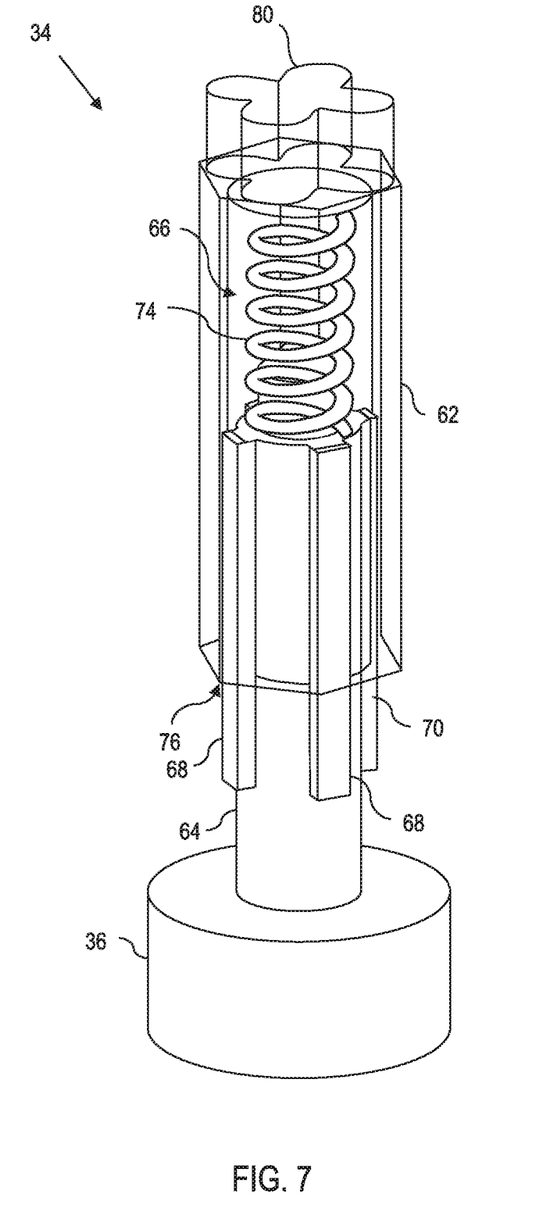
FIG. 7 is a partial exploded view of parts comprising a gyral-linear actuator according to aspects of the present disclosure.

Referring to FIG. 7, an example embodiment illustrates the primary shaft 62 axially receiving the secondary shaft 64 with the spring 74 engaged thereby. Here, compressing the secondary spring 74 moves the encoder connector 36 relatively closer to the plug end 80 of the primary shaft 62, and the bias of the secondary spring 74 in a non-compressed state moves the encoder connector 36 relatively farther from the plug end 80. This allows for adjustments to be made automatically to account for specific encoder requirements. Also, the keys 68 cooperate with corresponding slots 70 to prevent relative rotation of the primary shaft 62 relative to the secondary shaft 64. Other mechanisms can be used to prevent relative rotation therebetween.

Also shown in FIG. 7 is an example configuration of the plug end 80 at the tip of the primary shaft 62. As illustrated, the plug end 80 takes the form of a cross pattern.

Figure 8:
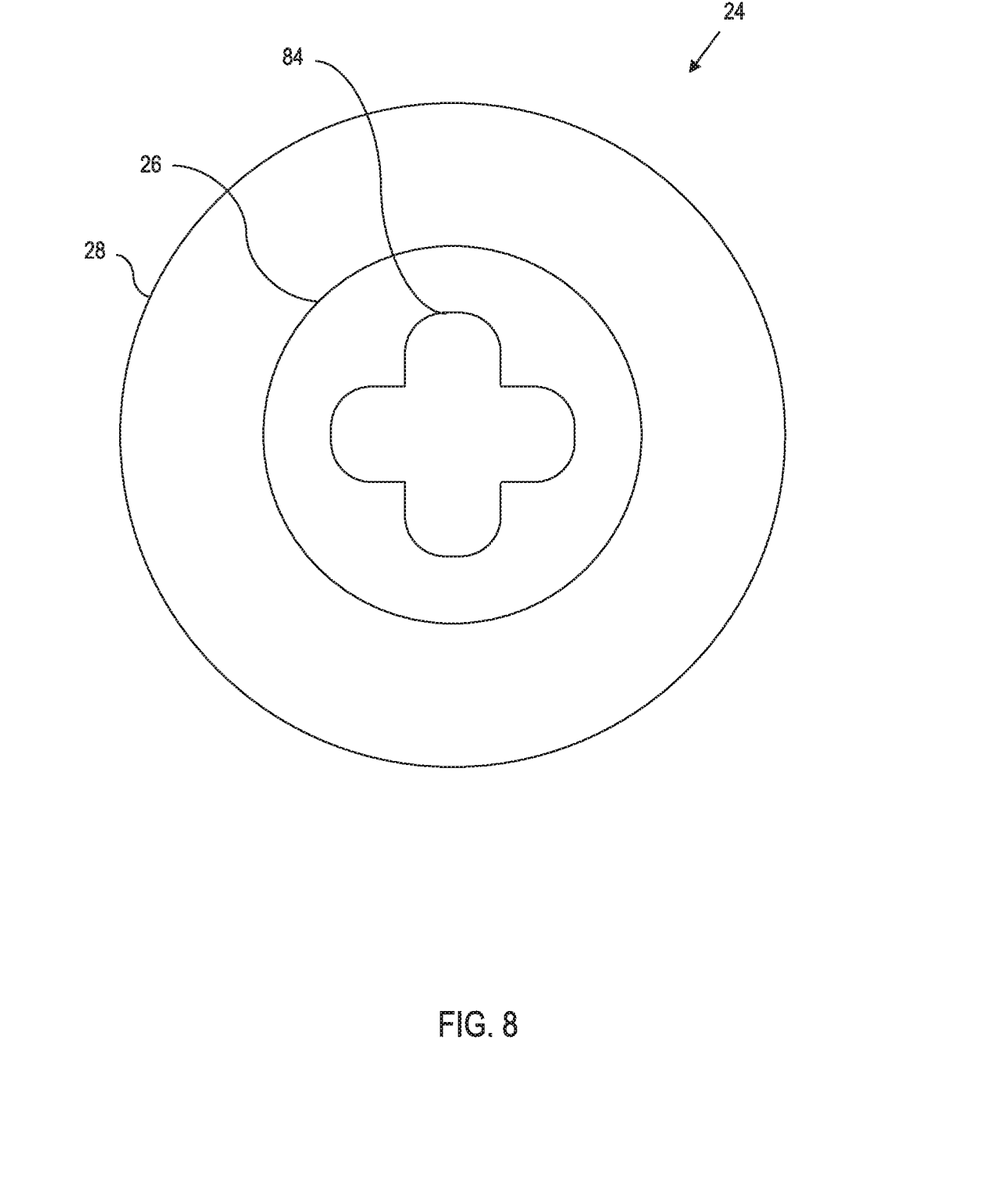
FIG. 8 is an inside view of a control member according to aspects of the present disclosure.

Referring to FIG. 8, the control member 24 (or optional insert 82) includes a receiver, implemented as a socket 84. The socket 84 has a shape complimentary to the shape of the plug end 80. For instance, the socket 84 can comprise a milled cross pattern. In this regard, a bottom surface of the control member 24 opposite the head 28 (e.g., bottom surface of the neck 26) can include a receptacle forming the socket 84. The socket 84 can be milled into the control member 24, or otherwise formed. Alternatively, the insert 82, where used, can include a molded or milled socket as described above.

Referring to FIG. 7 and FIG. 8, when receiver receives a distal end of the extension 34 (e.g., the plug end 80 is received into the mating socket 84), rotation of the head 28 of the control member 24, causes corresponding rotation of the neck 26. Because of the cross pattern of the plug and socket, the rotation of the neck 26 causes corresponding rotation of the coupler 32.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A gyral-linear actuator for an encoder, comprising:
   an actuator housing having a first end, a second end opposite the first end, and a hollow;
   a control member extending from the first end of the actuator housing;
   a primary spring within the hollow of the actuator housing;

a coupler having:
- an encoder connector and an extension that extends into the hollow of the actuator housing through the second end and couples the control member to the encoder connector, where the extension of the coupler comprises:
  - a primary shaft that is coupled to the control member, the primary shaft having a hollow;
  - a secondary shaft that is coupled to the encoder connector and cooperates axially with the primary shaft for relative axial movement therebetween; and
  - a secondary spring positioned in the hollow of the primary shaft adjacent to the secondary shaft;
- wherein, when the encoder connector is coupled to a rotary shaft of the encoder:
  - rotation of the control member causes corresponding rotation of the primary shaft, which causes corresponding rotation of the secondary shaft, which causes corresponding rotation of the encoder connector so as to turn the rotary shaft of the encoder;
  - depression of the control member causes corresponding depression of the encoder connector, wherein depression of the encoder connector causes corresponding compression of the primary spring as the primary shaft moves axially downward responsive thereto, and depression of the primary shaft causes compression of the secondary spring as the secondary shaft moves axially downward responsive thereto, causing depression of the rotary shaft of the encoder operating a switch function of the rotary encoder;
  - the actuator housing cooperates with an associated equipment housing containing the rotary encoder to distribute at least some of the force applied to the gyral-linear actuator to the equipment housing when a user depresses the control member by foot when operating the switch function of the rotary encoder.

2. The gyral-linear actuator of claim 1, wherein:
the actuator housing further comprises a generally cylindrical body between the first end and the second end; and
the body comprises a male threaded portion on an outside periphery.

3. The gyral-linear actuator of claim 1, wherein:
the control member comprises a neck axially received by the body of the actuator housing and a head positioned on a first end of the neck, where the neck cooperates with the head and the actuator housing to control a maximum length of axial travel of the actuator for depression of the rotary shaft to operate the switch function making the gyral-linear actuator further suitable for depressing the switch of the rotary encoder by foot pressure.

4. The gyral-linear actuator of claim 1, wherein:
the control member includes an inside surface having a receiver that receives a distal end of the extension.

5. The gyral-linear actuator of claim 4, wherein:
the receiver comprises a socket.

6. The gyral-linear actuator of claim 5, wherein:
the socket comprises a milled cross pattern.

7. The gyral-linear of claim 1 further comprising a cap that couples over an outside of the actuator housing and caps off a portion of the second end of the housing so that the spring seats between the cap and the control member, the cap having an aperture therethrough;
wherein the encoder connector of the coupler is positioned outside of the cap and the extension passes through the aperture of the cap.

8. The gyral-linear actuator of claim 7, wherein:
the actuator housing further comprises a generally cylindrical body between the first end and the second end;
the body comprises a male threaded portion on an outside periphery; and
the cap includes a female threaded portion that threads onto the male threaded portion of the body of the actuator housing.

9. The gyral-linear actuator of claim 1, wherein:
the secondary shaft is axially received in the hollow of the primary shaft;
the primary shaft has a male plug end that seats into a corresponding receptacle of the control member; and
the primary shaft and the secondary shaft have corresponding non-circular cross sections where the secondary shaft is axially received in the hollow of the primary shaft;
wherein, when the encoder connector is coupled to a rotary shaft of the encoder:
  rotation of the control member causes corresponding rotation of the encoder connector so as to turn the rotary shaft of the encoder; and
  depression of the control member causes corresponding depression of the rotary shaft of the encoder operating a switch function of the rotary encoder.

10. The gyral-linear actuator of claim 1, wherein:
the primary shaft has at least one key slot on an inside surface adjacent the hollow; and
the secondary shaft has at least one key that mates with a corresponding key slot of the primary shaft when the secondary shaft is axially received in the hollow of the primary shaft.

11. The gyral-linear actuator for an encoder, comprising:
an actuator housing having a first end, a second end opposite the first end, and a hollow;
a control member extending from the first end of the actuator housing;
a primary spring within the hollow of the actuator housing;
a cap that couples to the actuator housing so that the spring seats between the cap and the control member, the cap having an aperture therethrough; and
a coupler having:
  an encoder connector positioned outside of the cap;
  an extension that passes through the aperture of the cap, and extends into the hollow of the actuator housing through the second end, where the extension of the coupler comprises:
    a primary shaft that is coupled to the control member, the primary shaft having a hollow;
    a secondary shaft that is coupled to the encoder connector and cooperates axially with the primary shaft for relative axial movement therebetween; and
    a secondary spring positioned in the hollow of the primary shaft adjacent to the secondary shaft;
wherein when the encoder connector is coupled to a rotary shaft of the encoder:
  rotation of the control member causes corresponding rotation of the primary shaft, which causes corresponding rotation of the secondary shaft, which causes corresponding rotation of the encoder connector so as to turn the rotary shaft of the encoder;

depression of the control member causes corresponding depression of the encoder connector, wherein depression of the encoder connector causes corresponding compression of the primary spring as the primary shaft moves axially downward responsive thereto, and depression of the primary shaft causes compression of the secondary spring as the secondary shaft moves axially downward responsive thereto, causing depression of the rotary shaft of the encoder operating a switch function of the rotary encoder; and the cap and the actuator housing cooperate with an associated equipment housing containing the rotary encoder to distribute at least some of the force applied to the gyral-linear actuator to the equipment housing when a user depresses the control member by foot when operating the switch function of the rotary encoder.

12. The gyral-linear actuator of claim 11, wherein:
the actuator housing further comprises a generally cylindrical body between the first end and the second end; and
the body comprises a male threaded portion on an outside periphery such that when installed in the associated equipment housing, the cap is positioned within the equipment housing, the cylindrical body passes through the equipment housing and is secured thereto by a nut that threads onto the male threaded portion of the body.

13. The gyral-linear actuator of claim 12, wherein:
the control member comprises a neck axially received by the body of the actuator housing; and
a head positioned on a first end of the neck.

14. The gyral-linear actuator of claim 13, wherein:
the control member includes an inside surface having a receiver that receives a distal end of the extension; and
the receiver comprises a receptacle.

15. A gyral-linear actuator for an encoder, comprising:
an actuator housing having:
  a first end;
  a second end opposite the first end;
  a body between the first end and the second end; and
  a hollow that extends into the body from the second end thereof;
a control member extending from the first end of the actuator housing, the control member rotatable within the actuator housing and capable of axial movement within the body;
a first spring within the hollow of the actuator housing;
a primary shaft within the first spring and within the hollow that couples to the control member;
a cap that couples to the actuator housing so that the spring seats between the cap and the control member; the cap having an aperture therethrough; and
a shaft coupler having:
  a secondary shaft that passes through the aperture of the cap and engages the primary shaft; and
  a secondary spring seated between the primary shaft and the secondary shaft;
  an encoder connector at a distal end of the secondary shaft;
wherein, when the gyral-linear actuator is connected to an encoder;
  the encoder connector couples to a rotary shaft of the encoder;
    rotation of the control member causes corresponding rotation of the primary shaft, which causes corresponding rotation of the secondary shaft, which causes corresponding rotation of the encoder connector so as to turn the rotary shaft of the encoder; and
    depression of the control member causes corresponding depression of the encoder connector, wherein depression of the encoder connector causes corresponding compression of the primary spring as the primary shaft moves axially downward responsive thereto, and depression of the primary shaft causes compression of the secondary spring as the secondary shaft moves axially downward responsive thereto, causing depression of the rotary shaft of the encoder operating a switch function of the rotary encoder.

16. The gyral-linear actuator of claim 15, wherein:
the body comprises a male threaded portion on an outside periphery thereof.

17. The gyral-linear actuator of claim 15, wherein:
the cap comprises a cylindrical, knurled cap.

18. The gyral-linear actuator of claim 15, wherein:
the aperture in the cap is axially aligned with the body of the actuator housing.

* * * * *